United States Patent [19]

Inoue et al.

[11] 3,968,182

[45] July 6, 1976

[54] URETHANE RUBBER COMPOSITIONS REINFORCED WITH CHOPPED ORGANIC FIBERS

[75] Inventors: Sakae Inoue, Kodaira; Toshio Nishi, Musashi-Murayama; Shoson Shibata, Tokyo; Tsutomu Matsunaga; Yoshio Kaneko, both of Higashi-Murayama, all of Japan

[73] Assignee: Bridgestone Tire Company Limited, Tokyo, Japan

[22] Filed: June 5, 1974

[21] Appl. No.: 476,399

Related U.S. Application Data

[63] Continuation-in-part of Ser. No. 243,065, April 11, 1972, abandoned.

[30] Foreign Application Priority Data

Apr. 26, 1971  Japan.............................. 46-26704

[52] U.S. Cl.................................. 260/858; 260/13; 260/42.18; 260/859 R
[51] Int. Cl.² ........................................ C08L 75/12

[58] Field of Search...................... 260/858, 859, 13

[56] References Cited

UNITED STATES PATENTS

| | | | |
|---|---|---|---|
| 2,751,363 | 6/1956 | Martin | 260/9 |
| 2,763,624 | 9/1956 | Newell | 260/858 |
| 3,382,305 | 5/1968 | Breen | 260/857 PE |
| 3,527,729 | 9/1970 | Bingham | 260/858 |
| 3,663,469 | 5/1972 | Weissmahr | 260/858 |
| 3,746,669 | 7/1973 | Dunnom et al. | 260/3 |
| 3,790,437 | 2/1974 | Haley | 260/859 R |
| 3,830,685 | 8/1974 | Haley | 260/859 R |

*Primary Examiner*—Carman J. Seccuro
*Attorney, Agent, or Firm*—Stevens, Davis, Miller & Mosher

[57] ABSTRACT

Urethane rubber composition having an improved cut-crack resistance and a high modulus is obtained by incorporating chopped organic fibers having a diameter of 1–50$\mu$ and an aspect ratio of 50–1,000 to urethane rubber.

7 Claims, No Drawings

URETHANE RUBBER COMPOSITIONS REINFORCED WITH CHOPPED ORGANIC FIBERS

This application is a continuation-in-part of our copending application Ser. No. 243,065, filed Apr. 11, 1972, now abandoned.

The present invention relates to novel urethane rubber compositions reinforced with chopped organic fibers and more particularly urethane rubber compositions having a highly improved cut-crack resistance wherein chopped organic fibers are mixed with urethane rubber.

In general, since urethane rubber has a specific fluidity before cross-linking, it is possible to cast said rubber into a desired shape under atmospheric pressure or a low pressure and urethane rubber can be used in a broad application, for example, solid tire, roller, machine parts and the like. However, urethane rubber is poor in cut-crack resistance and therefore the urethane rubber is limited in the application of products and the use condition. Hence, in order to improve the cut-crack resistance of urethane rubber, it has heretofore been attempted to vary the molecular weight of the main chain and to vary the kind and amount of cross-linking agent and chain extenders. By such means a certain degree of the improvement has been obtained but a satisfactory effect has never been attained and rather modulus and other properties have been considerably deteriorated.

The object of the present invention is to provide novel urethane rubber compositions having both improved cut-crack resistance and high modulus.

The inventors have made various investigations with respect to a process for reinforcing urethane rubber and found that the object can be attained by mixing a relatively small amount of chopped organic fibers having the hereinafter described particular shape.

Elastomer compositions in which chopped fibers are admixed have been disclosed in British Pat. No. 1,075,644. That is, in this patent elastomer compositions having an improved creep resistance are obtained by incorporating 10–40% by weight of chopped inorganic or organic fibers to thermoplastic high molecular substances, such as natural rubbers, synthetic rubbers or urethane rubbers. However, the inventors have found that the cut-crack resistance of urethane rubber is rather deteriorated by mixing chopped inorganic fibers, such as glass fibers with urethane rubber and that only the fibers having a particularly defined shape among chopped organic fibers have a remarkable effect for the cut-crack resistance and accomplished the present invention.

The present invention consists in urethane rubber compositions in which chopped organic fibers having an aspect ratio (a ratio of length to diameter) of 50–1,000 are mixed and spread in urethane rubber.

The kind of chopped organic fibers to be used in the present invention is not particularly limited but the fibers having a modulus of $1 \times 10^4 - 2 \times 10^5$ Kg/cm² at 25°C are generally used, and for example, polyester fibers polyvinyl alcohol fibers, polyamide fibers, rayon fibers and polyacrylonitrile fibers are useful and particularly polyvinyl alcohol fibers, such as vinylon, polyamide fibers, such as nylon-6,6, rayon fibers and polyacrylonitrile fibers are preferable.

The moduli at 25°C of typical chopped organic fibers, although the moduli vary within a certain range depending upon the treating and measuring conditions of the fibers, are shown for reference in the following Table 1.

TABLE 1

| Fiber | Modulus (Kg/cm²) |
| --- | --- |
| Polyester | $1.0 \times 10^5$ |
| Rayon | $5.5 \times 10^4$ |
| Vinylon | $5.2 \times 10^4$ |
| Nylon-6,6 | $4.0 \times 10^4$ |
| Polyacrylonitrile | $7.0 \times 10^4$ |

The above selected chopped organic fibers are desired to have a high adhesive property to urethane rubber and an adhering treatment may be previously made by a conventional process prior to the mixing but since a strong adhesion is obtained between urethane and fibers without effecting particularly the adhering treatment, the rubber having a high cut-crack resistance can be obtained.

The chopped organic fibers to be used in the present invention have a diameter of 1–50µ and an aspect ratio of not less than 50 but the fibers having too large aspect ratio are entangled one another upon the mixing and the effect of the present invention cannot be obtained and the aspect ratio must be 50–1,000, preferably 80–500.

In the practice of the mixing of the chopped organic fibers with urethane rubber, a polyol, an organic polyfunctional isocyanate and a curing agent are concurrently mixed and stirred together with said fibers or the fibers are mixed and stirred with prepolymer wherein a polyol and an organic polyfunctional isocyanate have been reacted or with the prepolymer immediately after the addition of a curing agent, while prior to the curing.

Then, when the thus obtained fluid composition in which the chopped organic fibers are spread is cast under atmospheric pressure or a low pressure and the final crosslinking reaction is caused, polyurethane rubber dispersing chopped fibers can be produced.

The organic polyfunctional isocyanates to be used in the present invention are not particularly limited and among them diisocyanates are preferable. The diisocyanates are, for example, alkylene diisocyanates, such as hexamethylene diisocyanate and decamethylene diisocyanate, aromatic diisocyanates, such as phenylene diisocyanate, tolylene diisocyanate, naphthalene diisocyanate, 4,4'-diphenylmethane diisocyanate or the isomers thereof or the mixtures thereof. In addition, the chain extended diisocyanates, such as the reaction products of the aromatic diisocyanates with hexane triol or trimethylol propane, can be used. The polyols useful in the present invention are ones having two or more reactive hydrogen atoms which can react with polyfunctional isocyanate to form urethane polymers. Such polyols include polyesters, polyethers, polyalkylene glycols, polybutadiene glycol, styrene-butadiene copolymer having hydroxyl groups in both the ends and the like and polymercaptans and polyamines can be used instead of the polyols.

The curing agents for urethane rubber useful in the present invention are polyfunctional active hydrogen compounds, for example, aliphatic polyols, such as 1,4-butane diol, alicyclic polyols, such as 1,4-cyclohexane diol, aromatic diols, such as p-xylylene glycol, aliphatic polyamines, such as hexamethylenediamine, aromatic polyamines, such as 4,4'-methylene-bis(2- chloraniline) and a variety of aminoalcohols and the like.

The mixed amount of the chopped organic fibers to be used in the present invention is not particularly limited but the amount is preferred to be not more than 8% by volume, more particularly 1–6% by volume by taking casting processability of the resulting composition and the other physical properties (for example, elongation) of the cured composition into account. That is, in the fluid urethane composition containing the chopped organic fibers, when the viscosity becomes more than 6,000 poises, the casting processability is difficult and when the elongation is less than 200%, the composition becomes rigid and is not suitable for the dynamic application as elastic material but in the above described range of the mixed amount there is substantially no such fears.

As mentioned above, according to the present invention the cut-crack resistance and the modulus of urethane rubber can be improved.

Furthermore, since the casting can be made under atmospheric pressure or a low pressure as in the conventional process, it is not necessary to add modification to the conventional casting apparatus. Consequently, the scope of utilizing the urethane rubber can be expanded and the elastomer composition of the present invention has a very high commercial merit.

Moreover, the present invention is applicable to the usual casting fluid rubber other than urethane rubber.

The following examples are given in illustration of this invention and are not intended as limitations thereof.

EXAMPLE 1

To 100 parts by weight of Adiprene L-100 (Trademark of an isocyanate-polyether type prepolymer having isocyanate end group, which is made from polyether glycol and tolylene diisocyanate by Du Pont Co., Ltd.) was mixed 12.1 parts by weight of a crosslinking agent of 4,4′-methylene-bis(2-chloroaniline) (Trademark: Moca, made by Du Pont Co., Ltd.) at 100°. While the mixture is fluid, 1% by volume of chopped nylon-6,6 having a diameter of 13.7μ and an aspect ratio of 120, as a chopped organic fiber, was mixed to the mixture, and the resulting composition was cast into a plate, which was cured at 100°C for 3 hours to form an elastomer composition sample.

At the mixing of urethane rubber with the chopped fibers, such an assumption that the volume additive property of each material is established before and after the reaction or mixing was made, and the weight corresponding to the volume calculated from the specific gravity of each material was weighed.

For comparison, a sample which was not mixed with the chopped fibers and a sample which was mixed with chopped glass fibers were prepared.

The cut-crack resistances of the above obtained elastomer composition samples are shown in the following Table 2.

It can be seen from the above results that the cut-crack resistance of urethane rubber is remarkably improved by mixing chopped nylon-6,6 thereto, but inorganic fiber such as glass fiber, cannot improve the cut-crack resistance of urethane rubber. Because, glass fiber has an excessively high modulus of $8 \times 10^5$ Kg/cm$^2$, and the difference between the modulus of the glass fiber and that of urethane rubber is too large to improve satisfactorily the cut-crack resistance of the urethane rubber.

The above described cut-crack resistance test was made by means of a De Mattia fatigue tester and 10% constant elongation strain was applied repeatedly to the sample previously given a slight cut at a rate of 300 times per minute and the time until the sample was broken was determined. Furthermore, the modulus was determined by dividing the stress in 10% elongation with the strain.

EXAMPLES 2–5

Urethane rubber compositions in which 2.0% by volume of chopped nylon-6,6 having different aspect ratios was mixed in each sample, were prepared following to Example 1 and the cut-crack resistance test was made. The obtained results are shown in the following Table 3.

Table 3

| Sample No. | Diameter of fiber (μ) | Mixed amount (% by volume) | Aspect ratio | Cut-crack resistance (Time) |
|---|---|---|---|---|
| Example 2 | 13.7 | 2.0 | 50 | 80,000 |
| Example 3 | 13.7 | 2.0 | 80 | 110,000 |
| Example 4 | 13.7 | 2.0 | 120 | 132,000 |
| Example 5 | 13.7 | 2.0 | 500 | 125,000 |
| Comparative 3 | 13.7 | 2.0 | 30 | 16,000 |
| Comparative 4 | 13.7 | 2.0 | 1,200 | 60,000 |

The above results show that when the aspect ratio is more than 50, the cut-crack resistance of urethane rubber is noticeably improved, and when the ratio is 120, the improvement in the cut-crack resistance is most high. While, when the aspect ratio is more than 120, there is no appreciable change in the cut-crack resistance, and when the ratio is more than 1,000, the cut-crack resistance is very low.

EXAMPLES 6 and 7

Urethane rubber compositions, in which 2.0% by volume of chopped nylon-6,6 fibers having same aspect ratio amd different diameters was mixed in each sample, were prepared according to Example 1, and the cut-crack resistance test was made.

The obtained results are shown in the following Table 5.

Table 2

| Sample No. | Fiber | Diameter of fiber (μ) | Aspect ratio | Mixed amount (% by volume) | Cut-crack resistance (Time) | Modulus (Kg/cm$^2$) |
|---|---|---|---|---|---|---|
| Example 1 | Nylon-6,6 | 13.7 | 120 | 1 | 24,700 | 490 |
| Comparative 1 | Not mixed | — | — | — | 15,400 | 340 |
| Comparative 2 | Glass | 18.4 | 120 | 1 | 6,100 | 490 |

Table 5

| Sample No. | Aspect ratio | Mixed amount (% by volume) | Diameter of fiber ($\mu$) | Cut-crack resistance (Time) |
| --- | --- | --- | --- | --- |
| Example 6 | 120 | 2.0 | 19.3 | 135,000 |
| Example 7 | 120 | 2.0 | 29.5 | 133,000 |

The above results show that even when organic fibers having a large diameter are used, if the aspect ratios of the fibers are same, the fibers can attain the same effect.

EXAMPLES 8–11

By varying the amount of chopped nylon-6,6 having an aspect ratio of 120, urethane rubber compositions were prepared according to Example 1 and the following tests were made.

The obtained results are shown in the following Table 6 together with those of comparative rubber compositions.

Table 6

| Sample No. | Mixed amount (% by volume) | Cut-crack resistance (Time) | Elongation in breakage (%) | Casting processability |
| --- | --- | --- | --- | --- |
| Example 8 | 1 | 24,700 | 400 | Easy |
| Example 9 | 2 | 132,000 | 320 | Easy |
| Example 10 | 5 | 145,000 | 290 | Easy |
| Example 11 | 8 | 148,000 | 200 | Somewhat difficult |
| Comparative 5 | 0 | 15,400 | 440 | Easy |
| Comparative 6 | 10 | 140,000 | 170 | Difficult |

The above results show that as the amount of the chopped organic fibers are increased, the cut-crack resistance is improved, but when said amount exceeds 8% by volume, the elongation in breakage lowers to less than 200% and further the casting processability becomes difficult and the cut-crack resistance also lowers.

EXAMPLES 12–14

As a chopped organic fiber other than nylon-6,6 vinylon, polyester fiber or polyacrylonitrile fiber was used, and urethane rubber compositions were prepared according to Example 1, and the cut-crack resistance test and other tests were made.

The obtained results are shown in the following Table 7.

Table 7

| Sample No. | Fiber | Diameter of fiber ($\mu$) | Aspect ratio | Mixed amount (% by volume) | Cut-crack resistance (Time) | Modulus (Kg/cm$^2$) | Casting processability |
| --- | --- | --- | --- | --- | --- | --- | --- |
| Example 12 | Vinylon | 25.8 | 120 | 1 | 57,700 | 450 | Easy |
| Example 13 | Polyester | 24.8 | 120 | 1 | 19,900 | 400 | '' |
| Example 14 | Polyacrylonitrile | 11.0 | 90 | 5 | 102,000 | 400 | '' |

It can be seen from the above results that chopped fibers of vinylon, polyester and polyacrylonitrile can also attain the object of the present invention.

As described above, the cut-crack resistance of urethane rubber can be noticeably improved by using chopped organic fibers having a shape defined in the present invention in an amount defined in the present invention.

What is claimed is:

1. A fiber-reinforced urethane elastomer composition characterized by improved cut-crack resistance and high modulus, and having excellent casting processability before curing, said urethane elastomer composition comprising
    a. an urethane elastomer and
    b. a chopped organic fiber selected from the group consisting of polyamide fiber, polyvinyl alcohol fiber, polyester fiber, rayon and polyacrylonitrile fiber, having a diameter of from 1 micron to 50 microns and an aspect ratio of 80 to 500, said chopped organic fiber being present in not more than 8% by volume based on the total volume of said elastomer composition.

2. The elastomer composition as claimed in claim 1, wherein said amount is 1–6% by volume based on the total volume of said elastomer composition.

3. The elastomer composition as claimed in claim 2, wherein said chopped organic fiber is polyamide fiber.

4. The elastomer composition as claimed in claim 2, wherein said chopped organic fiber is polyvinyl alcohol fiber.

5. The elastomer composition as claimed in claim 2, wherein said chopped organic fiber is polyacrylonitrile fiber.

6. The elastomer composition as claimed in claim 1, wherein said urethane elastomer is prepared by reacting aromatic diisocyanate, polyalkylene glycol and aromatic polyamine.

7. The elastomer composition as claimed in claim 1, wherein said chopped organic fiber is a polyamide fiber which is nylon-6,6.

* * * * *